(12) United States Patent
Haga et al.

(10) Patent No.: US 7,634,560 B2
(45) Date of Patent: Dec. 15, 2009

(54) METHOD FOR MEASURING SERVER PERFORMANCE, SYSTEM FOR MEASURING SERVER PERFORMANCE AND COMPUTER PROGRAMS THEREFOR

(75) Inventors: Futoshi Haga, Sagamihara (JP); Yutaka Kudo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 629 days.

(21) Appl. No.: 11/286,196

(22) Filed: Nov. 22, 2005

(65) Prior Publication Data
US 2006/0224731 A1    Oct. 5, 2006

(30) Foreign Application Priority Data
Mar. 31, 2005    (JP)    ............... 2005-100500

(51) Int. Cl.
G06F 15/173    (2006.01)
(52) U.S. Cl. ................. 709/224; 709/226; 709/223
(58) Field of Classification Search .......... 709/224
See application file for complete search history.

(56) References Cited

U.S. PATENT DOCUMENTS

| | | | |
|---|---|---|---|
| 5,790,425 A | * | 8/1998 | Wagle ............... 709/218 |
| 6,985,940 B1 | * | 1/2006 | Jenkin ............... 709/224 |
| 2002/0039339 A1 | * | 4/2002 | Shiozaki et al. ......... 369/53.27 |
| 2003/0177417 A1 | * | 9/2003 | Malhotra et al. ......... 714/42 |
| 2004/0205120 A1 | * | 10/2004 | Dar et al. ............. 709/203 |
| 2004/0206072 A1 | * | 10/2004 | Surnilla et al. .......... 60/285 |

FOREIGN PATENT DOCUMENTS

| | | |
|---|---|---|
| JP | 2002041331 | 2/2002 |
| JP | 2004171226 | 6/2004 |
| JP | 2004318454 | 11/2004 |

\* cited by examiner

*Primary Examiner*—Firmin Backer
*Assistant Examiner*—Ebrahim Golabbakhsh
(74) *Attorney, Agent, or Firm*—Townsend and Townsend and Crew LLP (57) ABSTRACT

A server performance measurement system for efficiently measuring and collecting server performance differently depending on each business application in actual operation environment in which business applications are operated, includes a plurality of servers for processing requests from users, a load balancer for suitably distributing loads of the plurality of servers, a test management server computer and a test load control server computer, which can communicate with one another. The test management server computer includes a test start/end information processing unit, a server setting control unit, a test result information processing unit and a test result information management unit. The business application is operated in at least one of the plurality of servers to measure performance of the server.

9 Claims, 6 Drawing Sheets

| TEST ID | SERVER NAME | ADDRESS | BUSINESS ID |
|---------|-------------|---------|-------------|
| 001 | SERVER C | 10.0.0.1 | 1001 |
| 002 | SERVER D | 10.0.0.2 | — |
| ... | ... | ... | ... |

FIG.4

| ADDRESS | SERVER NAME | BUSINESS ID | LOAD BALANCER TO BE CONNECTED |
|---------|-------------|-------------|-------------------------------|
| 10.0.0.10 | SERVER A | 1001 | LOAD BALANCER 1 |
| 10.0.0.11 | SERVER B | 1001 | LOAD BALANCER 1 |
| 10.0.0.20 | SERVER E | 1002 | LOAD BALANCER 2 |
| ... | ... | ... | ... |

FIG.5

| BUSINESS ID | BUSINESS APPLICATION PROGRAM | TEST SITUATION |
|-------------|------------------------------|----------------|
| 1001 | App1001.exe | DURING TEST |
| 1002 | App1002.exe | |
| ... | ... | ... |

FIG.6

| SERVER SPECIFICATION | ADDRESS | BUSINESS ID | PERFORMANCE INDEX | | | | |
|---|---|---|---|---|---|---|---|
| CPU:800M Hz MEMORY: 512M BYTES | 10.0.0.1 | 1001 | NUMBER OF REQUESTS / sec. | 3 | 8 | 12 | --- |
| | | | CPU LOAD (%) | 5 | 7 | 9 | --- |
| | | 1002 | NUMBER OF REQUESTS / sec. | 5 | 13 | 21 | --- |
| | | | CPU LOAD (%) | 5 | 7 | 9 | --- |
| | | --- | --- | | | | |
| CPU:1.3G Hz MEMORY: 1024M BYTES | 10.0.0.2 | 1001 | NUMBER OF REQUESTS / sec. | 3 | 8 | 12 | --- |
| | | | CPU LOAD (%) | 5 | 7 | 9 | --- |
| | | --- | --- | | | | |
| --- | --- | --- | --- | | | | |

| CPU LOAD (%) | SAMPLING NUMBER | SAMPLING INTERVAL |
|---|---|---|
| MAXIMUM VALUE: 95<br>MINIMUM VALUE: 5 | 46 | 2 |

FIG.9

| SERVER ADDRESS TO BE TESTED | BUSINESS ID TO BE TESTED |
|---|---|
| 10.0.0.1 | 1001 |

FIG.10

| CPU LOAD (%) AT LAST TIME | TARGET CPU LOAD (%) AT THIS TIME |
|---|---|
| 7 | 9 |

FIG.11

| ADDRESS | NUMBER OF PROCESSED REQUESTS PER sec. | CPU LOAD (%) |
|---|---|---|
| 10.0.0.1 | 8 | 10 |

FIG.12

METHOD FOR MEASURING SERVER PERFORMANCE, SYSTEM FOR MEASURING SERVER PERFORMANCE AND COMPUTER PROGRAMS THEREFOR

CLAIM OF PRIORITY

The present application claims priority from Japanese application JP 2005-100500 filed on Mar. 31, 2005, the content of which is hereby incorporated by reference into this application.

FIELD OF THE INVENTION

The present invention relates to a server performance measurement method for operating a business application in at least one of a plurality of servers for processing requests from users to implement a test for measuring performance of the server, a server performance measurement system for making it possible to implement the test and a computer program used therefor.

BACKGROUND OF THE INVENTION

In order to complete the processing using a computer in as a short time as possible, it is indispensable to utilize a super computer having high processing performance. However, since the super computer having the high processing performance is very expensive, a computer having lower processing performance is often used to make processing. As a result, it takes considerable time to make processing and when the processing capability thereof is exceeded, there is the possibility that the computer hangs up on the way of processing.

Recently, attention is paid to the technique named grid computing as a measure for solving such problem. "Grid" is a word derived from the "power grid" (high-voltage transmission network). The grid computing is the environment in which computers dispersed geographically are combined to make it possible to utilize computer resources without consciousness of occurrence places thereof as if they were water or electricity and forms a different-kind mixing system constituted by a plurality of computers. Further, the grid computing is the setup in which execution environment of data and programs can be shared mutually among systems.

The grid computing makes it possible to utilize resources of high-performance computers in the grid so that processing of a heavy load can be also executed even when there is not provided high-performance computers in itself. Further, the grid computing can divide processing into units that can be independently executed in parallel and assign the units to a plurality of computers existing in the grid, respectively, to thereby disperse a load. Accordingly, even if computers having relatively low performance are combined, processing of a heavy load can be executed.

Moreover, in the system having a plurality of computers having high performance, a load can be dispersed properly by the grid. In other words, when a load is not dispersed consciously, there is a tendency that a load is concentrated on a computer having highest performance and other relatively low-speed computers fall into the situation that they do not almost use the CPU power. Accordingly, each of the computers provided in the system can be managed as a member of the grid to thereby disperse the load and utilize resources efficiently.

From the above advantages, the computer grid is constructed as the computer environment realized by integrating techniques such as virtual operating system (OS), clustering, distributed system and autonomous system to produce results. The setup for constructing the grid computing is mainly formed in a middleware level so far.

The advantages of the computer grid are considered to be obtained not only in the scientific and technical fields but also in the business grid in which the computer grid is applied to the business field and which is represented in that the business application service, for example, is provided efficiently.

In a data center divided into an enterprise system for operating the business application to process requests from users and a management system for managing servers and the like constituting the enterprise system and in which the enterprise system and the management system are connected through a network to each other, addition or exchange of enterprise servers constituting the enterprise system due to deterioration of the enterprise servers and increased customers is indispensable and important operation and management business. In such operation and management business, it is important to grasp the performance of newly introduced enterprise servers when environment of the enterprise system is set and an amount of resources such as the number of enterprise servers is decided.

As an apparatus for measuring performance of a plurality of servers efficiently, a server performance measurement apparatus is disclosed in patent document 1 (JP-A-2002-41331). The server performance measurement apparatus includes a measurement condition setting unit for setting performance measurement conditions, a performance measurement execution control unit for broadcasting a performance measurement instruction produced on the basis of the performance measurement conditions to all servers to be performance-measured to thereby measure performance of the servers on the same conditions and a measured result management unit for managing measured results transmitted from the servers collectively.

Further, as an apparatus for measuring performance and load of a communication apparatus in actual operation efficiently, a performance and load measurement apparatus is disclosed in patent document 2 (JP-A-2004-171226). The performance and load measurement apparatus includes a measurement unit for measuring the reception time that a plurality of packets processed by the communication apparatus successively are received and a performance presumption unit for presuming packet processing performance of the communication apparatus on the basis of the time intervals of the reception time of the packets measured by the measurement unit, to thereby measure the performance or load of the communication apparatus.

As an apparatus for providing a method for reproducing an access pattern near to actual operation environment of WWW server to obtain marginal performance value having high reliability, a marginal performance measurement apparatus of WWW server is disclosed in patent document 3 (JP-A-2004-318454). The marginal performance measurement apparatus of WWW server, after reproducing a load based on a recorded access pattern of an end user for WWW server in actual operation environment, reproduces the load while increasing the access frequency to measure performance value, so that the access frequency when predetermined requirement performance of WWW server is exceeded is presented as the marginal performance value of WWW server.

Further, the benchmark test is also known as a method for estimating server performance. There is known, for example, the performance measurement tool SPECjAppServer 2004 (Trade Name) of EJB (Enterprise Java Beans) server by Web 3-hierarchy application in which EJB application is connected to processing such as JSP (Java Server Pages), Servlet and JDBC driver and the load test is performed to calculate the workload of the EJB server.

However, in the data center in which the business application is operated to process the requests from the users, even when the server performance is measured, the estimation standard for server performance is different depending on characteristics of business applications to be operated and accordingly it is necessary to measure the server performance in each business application to be operated.

The server performance measurement apparatus disclosed in the patent document 1 can measure performance of a plurality of servers at the same time zone, although since a concrete performance measurement method is not described, it is considered that performance cannot be measured for each business application.

The performance and load measurement apparatus disclosed in the patent document 2 is to measure performance and load of the communication apparatus in actual operation efficiently without requiring human labor due to installation and management of apparatuses, although since performance and load of servers are presumed from the transmission and reception time of packets constituting test data, it is impossible to measure performance for each business application.

The marginal performance measurement apparatus of WWW server disclosed in the patent document 3 is to utilize the access pattern of the end user near to the actual operation environment of WWW server to measure performance of WWW server, although since the access pattern of the end user stored in database is not formed on condition that every state is supposed and the measured performance is the marginal performance value, it is difficult to get a performance index reflecting characteristics of each business application.

Therefore, there is a problem that the conventional method and apparatus for measuring the server performance cannot obtain the performance index reflecting characteristics of each business application.

Further, in the estimation method of server performance using the benchmark test, a load is given to the server to be measured externally until the load on the server reaches 100% so that performance thereof is measured and accordingly there is a problem that the server performance index reflecting characteristics of each business application cannot be obtained.

SUMMARY OF THE INVENTION

It is an object of the present invention to provide a server performance measurement method and a server performance measurement system for efficiently measuring and collecting server performance different depending on each business application in actual operation environment in which business applications are operated and computer programs used therefor.

According to the present invention, the server performance measurement method for operating a business application in at least one of a plurality of servers for processing requests from users to implement a test for measuring performance of the server to be tested, comprises the steps of:

a first step of transmitting information necessary for start or end of the test for measuring performance of the server;

a second step of extracting necessary information from a database on the basis of the information transmitted in the first step and preparing information required to set the server and a load balancer for suitably distributing a load of the server and connected to the server in a mutually communicatable state after start or end of the test for measuring performance of the server to be transmitted to the server and the load balancer;

a third step of extracting information for controlling the load of the server and containing a target load value of the server from a database on the basis of the information transmitted in the first step and starting the test for measuring performance of the server;

a fourth step of receiving feedback information transmitted from the server;

a fifth step of comparing a load value of the server contained in the feedback information with the target load value of the server to decide whether the load of the server is varied or not and, when the load of the server is varied, preparing feedback information rewriting information containing policy for varying the load of the server to be transmitted and, when the load of the server is not varied, varying the target load value of the server and transmitting information containing test result information concerning result of the measurement of the test for measuring performance of the server;

a sixth step of rewriting the received feedback information on the basis of the feedback information rewriting information and transmitting the rewritten feedback information to the load balancer for suitably distributing the load of the server to be tested;

a seven step of successively obtaining information containing the test result information and judging end time of the test from the obtained test result information to be notified; and an eighth step of relating the test result information to the business application operated in each server to be stored and managed in a test result information database.

The server performance measurement method according to the present invention further comprises a step of providing a program for the business application operated in the server to the server.

Further, the server performance measurement method according to the present invention further comprises a step of deciding the server and the business application operated in the server on the basis of test implementation policy information defining policy for implementing the test for measuring performance of the server.

According to the present invention, the server performance measurement system for operating a business application in at least one of a plurality of servers for processing requests from users to make it possible to implement a test for measuring performance of the server to be tested, including a plurality of servers, a load balancer for suitably distributing loads of the plurality of servers, a test management server computer for providing information necessary for the test for measuring performance of the server and recording result of the test for measuring performance of the server to be managed, and a test load control server computer for controlling the load of the server to implement the test for measuring performance of the server, which are connected to one another in a mutual communicatable state, wherein the test management server computer comprises:

a test start/end information processing unit for transmitting information necessary for start or end of the test for measuring performance of the server;

a server setting control unit for extracting necessary information from databases within the test management server computer including a server setting information database in which information concerning the plurality of servers and the load balancer and required to implement the test for measuring performance of the server is stored on the basis of the information necessary for start or end of the test, transmitted from the test start/end information processing unit and preparing information required to set the server and the load balancer for suitably distributing the load of the server after start or end of the test for measuring performance of the server to be transmitted to the server and the load balancer;

a test result information processing unit for successively obtaining information containing test result information concerning result of the implementation of the test for measuring performance of the server, transmitted from the test load control server computer and judging end time of the test on the basis of the obtained test result information to notify information concerning the end time of the test to the test start/end information processing unit; and a test result information management unit for relating the test result information obtained by the test result information processing unit to the business application operated in each server to be stored and managed in a test result information database.

The test load control server computer in the server performance measurement system according to the present invention, comprises:

a test start processing unit for extracting information for controlling the load of the server containing a target load value of the server from a database portion on the basis of information necessary for start of the test, transmitted from the test start/end information processing unit and starting the test for measuring performance of the server;

a feedback information reception unit for receiving feedback information transmitted from the server;

a test operation processing unit for comparing a load value of the server contained in the feedback information with the target load value of the server to decide whether the load of the server is varied or not and, when the load of the server is varied, preparing feedback information rewriting information containing policy for varying the load of the server to be transmitted and, when the load of the server is not varied, varying the target load value of the server and transmitting information containing test result information concerning result of implementation of the test for measuring performance of the server; and a feedback information rewriting and transmission unit for rewriting the received feedback information on the basis of the feedback information rewriting information and transmitting the rewritten feedback information to the load balancer for suitably distributing the load of the server.

Further, the test management server computer in the server performance measurement system according to the present invention further comprises a business application provision unit for providing a program for the business application operated in the server to the server and the server setting control unit, and the server setting control unit extracts information from the server setting information database and a business application information database in which information concerning the business application containing the program for the business application operated in the server to be tested is stored on the basis of an instruction from the test start/end information processing unit and preparing information required to set the server to be tested and the load balancer for suitably distributing the load of the server after start or end of the test for measuring performance of the server to be transmitted to the server and the load balancer.

Further, the server performance measurement system according to the present invention comprises a client computer which can communicate with the test management server computer and prepares test implementation policy information defining policy for implementing the test for measuring performance of the server to transmit the test implementation policy information to the test management server computer.

Furthermore, the test management server computer in the server performance measurement system according to the present invention further comprises a business-to-be-tested decision unit for deciding the server to be tested and the business application operated in the server on the basis of the test implementation policy information transmitted from the client computer.

A first computer program according to the present invention for causing a computer to function as the following units, comprises:

a test start/end information processing unit for transmitting information necessary for start or end of a test for measuring performance of at least one of a plurality of servers for processing requests from users;

a server setting control unit for extracting necessary information from a database on the basis of the information necessary for start or end of the test transmitted from the test start/end information processing unit and preparing information required to set the server and a load balancer for suitably distributing a load of the server after the start or end of the test for measuring performance of the server to be transmitted to the server and the load balancer;

a test result information processing unit for successively obtaining information containing test result information concerning result of the implementation of the test for measuring performance of the server and judging end time of the test from the obtained test result information to notify information concerning the end time of the test to the test start/end information processing unit; and a test result information management unit for relating the test result information obtained by the test result information processing unit to the business application operated in each server to be stored and managed in a test result information database.

A second computer program according to the present invention for causing a computer to function as the following units, comprises:

a test start processing unit for extracting information for controlling a load of at least one of a plurality of servers for processing requests from users and containing a target load value of the server from a database portion on the basis of information necessary for start of a test for measuring performance of the server and starting the test for measuring performance of the server;

a feedback information reception unit for receiving feedback information transmitted from the server;

a test operation processing unit for comparing a load value of the server contained in the feedback information with the target load value of the server to decide whether the load of the server is varied or not and, when the load of the server is varied, preparing feedback information rewriting information containing policy for varying the load of the server to be transmitted and, when the load of the server is not varied, varying the target load value of the server and transmitting information containing test result information concerning result of implementation of the test for measuring performance of the server; and a feedback information rewriting and transmission unit for rewriting the received feedback information on the basis of the feedback information rewriting information and transmitting the rewritten feedback information to a load balancer for suitably distributing the load of the server.

According to the present invention, performance of the server different depending on each business application can be measured efficiently in actual operation environment in which the business application is operated.

Further, according to the present invention, an effective index concerning the server performance and reflecting characteristics of each business application can be obtained without obstructing usual business.

Other objects, features and advantages of the invention will become apparent from the following description of the embodiments of the invention taken in conjunction with the accompanying drawings.

DESCRIPTION OF THE EMBODIMENTS

Figure 1:
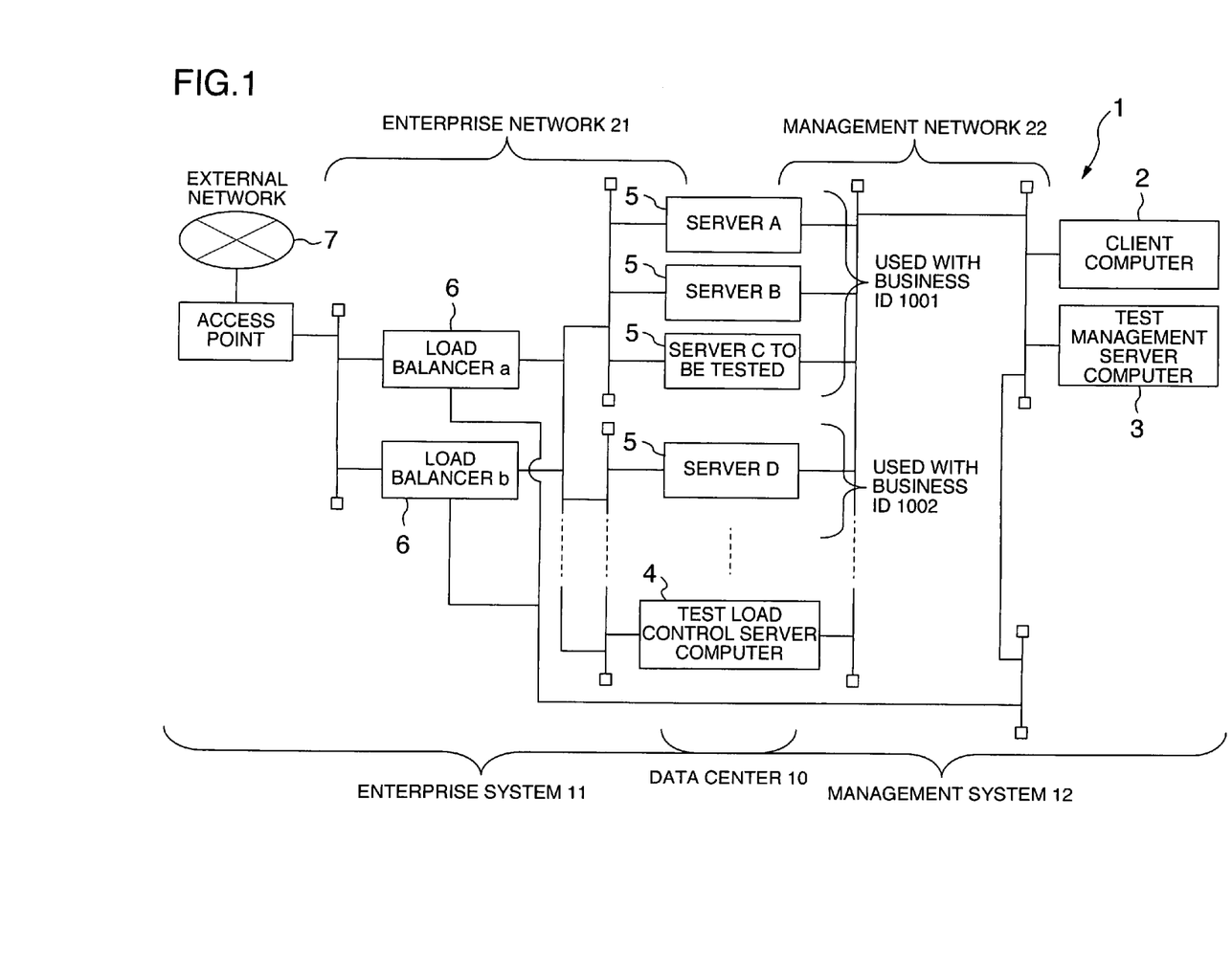
FIG. 1 is a conceptual diagram illustrating a basic configuration of a server performance measurement system according to an embodiment of the present invention which can implement a server performance measurement method of the present invention.
Figure 2:
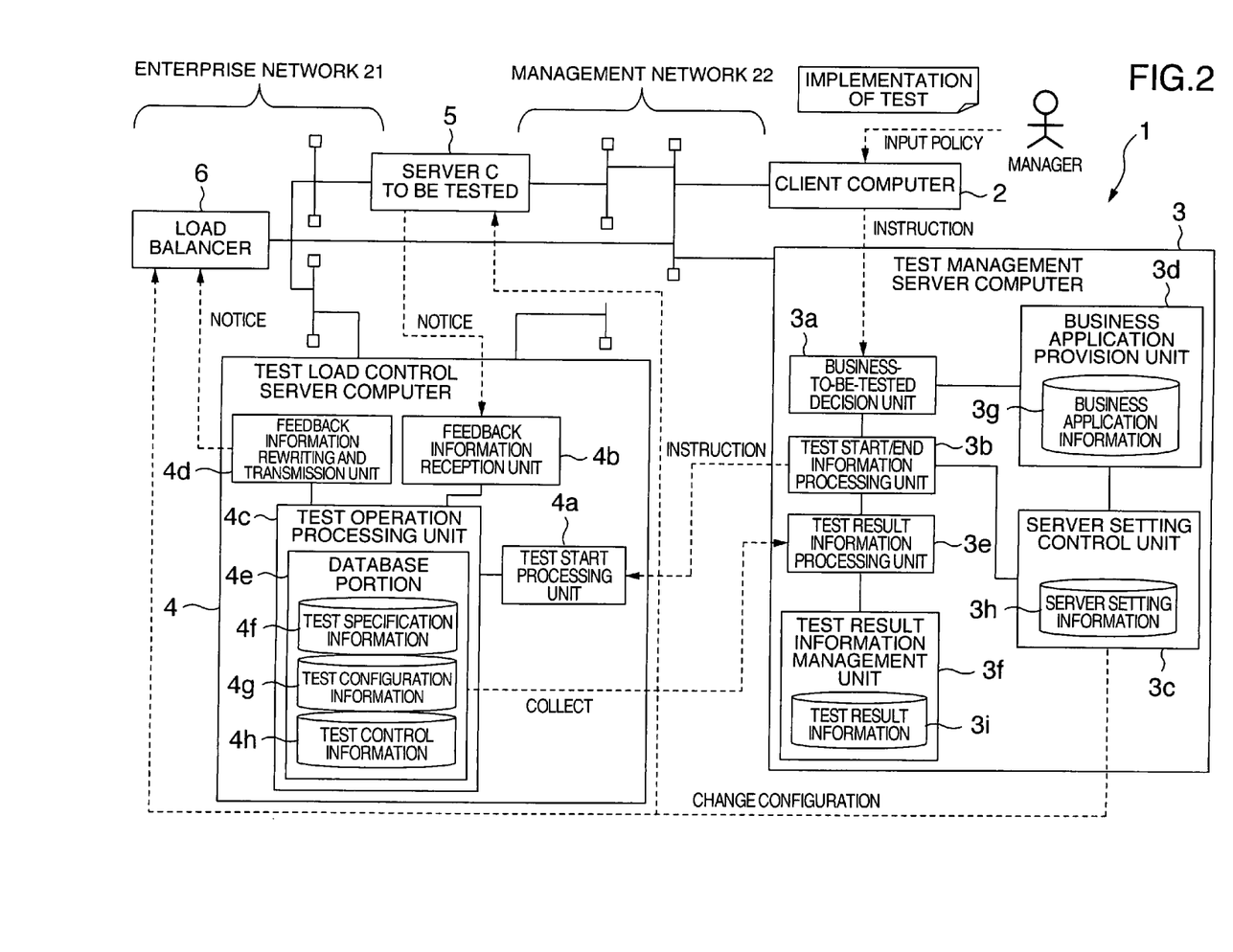
FIG. 2 is a conceptual diagram illustrating a configuration of a server performance measurement system according to an embodiment of the present invention which can implement a server performance measurement method of the present invention.

The present invention is now described in further detail. FIG. 1 illustrates a basic configuration of a server performance measurement system according to an embodiment of the present invention which can implement a server performance measurement method of the present invention, and FIG. 2 illustrates a configuration of a server performance measurement system according to an embodiment of the present invention which can implement a server performance measurement method of the present invention.

As shown in FIG. 1, a data center 10 using a plurality of servers 5 to operate a plurality of business applications and process requests from users is divided into an enterprise system 11 which operates the business applications to process the requests from the user and a management system 12 which manages the plurality of servers constituting the enterprise system. The enterprise system 11 and the management system 12 are connected through a management network 22 to each other.

Networks in the data center 10 can be broadly divided into an enterprise network 21 connected through an access point to an external network 7 such as the Internet and connected to a test load control server computer 4 and the management network 22 connected to a client computer 2, a test management server computer 3 and a test load control server computer 4. The networks 21 and 22 are logically separated but they are not required to be physically separated. Servers to be subjected to a test for measuring performance of the servers in the server performance measurement system of the present invention and load balancers 6 functioning as load distribution units for suitably distributing the loads of the servers to be tested are connected to both of the enterprise network 21 and the management network 22 in the data center 10.

Since a request can be transmitted through the access point from the enterprise network 21 to the business application, the server performance measurement system 1 controls the server 5 from the side of the management network 22 to measure a server performance index. Further, since the loads are dispersed by the load balancers 6, the number of servers used by the business application can be increased or decreased to change the processing performance of the enterprise system in response to the request. The load balancers 6 can respond to active-feedbacks.

Further, in FIG. 1, the server performance measurement system 1 is installed in the data center 10, although the server performance measurement system may be installed outside of the data center. When the server performance measurement system is installed in the data center, the server performance measurement system may be operated by remote control.

As shown in FIG. 2, the server performance measurement system 1 includes the client computer 2, the test management server computer 3, the test load control server computer 4, the plurality of servers 5 and the load balancer 6 for suitably distributing the loads of the plurality of servers 5. The client computer 2, the test management server computer 3, the test load control server computer 4, the plurality of servers 5 and the load distribution unit 6 can communicate with one another through the management network 22.

The load distribution unit 6 has the function of distributing the load of server suitably. As the load distribution unit usable in the present invention, for example, the load balancer is suitable, although not limited thereto as far as it can obtain feedback information containing the load situation of server notified from the server to be tested and perform load distribution control by active feedback for adjusting the distribution of requests.

Figure 3:
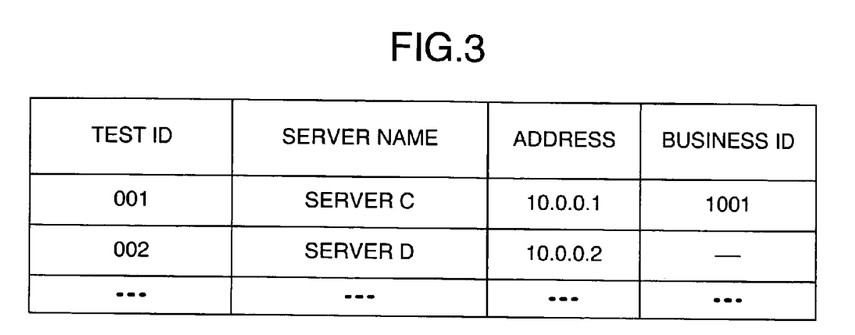
FIG. 3 shows an example of test implementation policy information.

The client computer 2 includes a general human interface for inputting policy for implementation of the test by a manager of the server performance measurement system of the present invention and prepares test implementation policy information (as shown in FIG. 3, for example) defining the policy for implementation of the test for measuring performance of any server out of the plurality of servers for processing requests from users. The client computer 2 transmits the prepared test implementation policy information to the test management server computer 3.

The test management server computer 3 provides information required for the test for measuring performance of the server to be tested and records result of the test for measuring performance of server to manage the test result. The test management server 3 includes a business-to-be-tested decision unit 3a, a test start/end information processing unit 3b, a server setting control unit 3c, a business application provision unit 3d, a test result information processing unit 3e and a test result information management unit 3f.

The business-to-be-tested decision unit 3a decides the server 5 to be tested and a business application operated in the server 5.

The server 5 to be tested and the business application operated in the server 5 are decided on the basis of the test implementation policy information transmitted from the client computer 2 while referring to information extracted from a business application information database 3g. When the server 5 to be tested and the business application operated in the server 5 are designated in the test implementation policy information, the server 5 to be tested and the business application operated in the server 5 are decided in accordance with the designation.

When the business-to-be-tested decision unit 3a decides the server 5 to be tested and the business application operated in the server 5, the business-to-be-tested decision unit 3a transmits information concerning the decided server 5 to be tested and the decided business application operated in the server 5 to the test start/end information processing unit 3b.

The test start/end information processing unit 3b transmits information necessary for start or end of the test for measuring performance of the server 5 to be tested.

For example, when the test start/end information processing unit 3b receives information concerning the server 5 to be tested and the business application operated in the server 5 and transmitted from the business-to-be-tested decision unit 3a, the test start/end information processing unit 3b transmits information concerning the server 5 to be tested and the business information operated by the server 5 together with an instruction for starting the test to a test start processing unit 4a of the test load control server computer 4 and the server setting control unit 3c.

Further, when the test start/end information processing unit 3b receives information concerning the end time of the test described later, the test start/end information processing unit 3b transmits an instruction for ending the test to the server setting control unit 3c.

The server setting control unit 3c extracts necessary information from a server setting information database 3h and the business application information database 3g described later on the basis of information necessary for start or end of the test, transmitted from the test start/end information processing unit 3b and prepares information required to set the server 5 and the load balancer for suitably distributing the load of the server 5 after start or end of the test for measuring performance of the server 5 to be tested to be transmitted to the server 5 and the load balancer 6.

Figure 4:
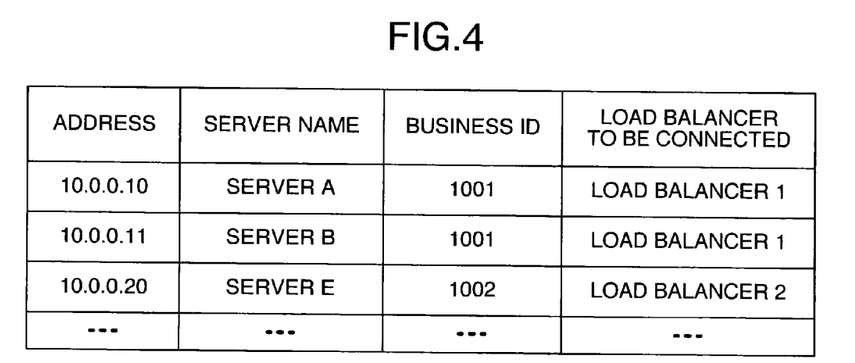
FIG. 4 shows an example of contents of information stored in a server setting information database.

The server setting information database 3h stores information concerning the plurality of servers 5 and the load balancer 6 required for implementation of the test for measuring performance of the server 5 to be tested, as shown in FIG. 4, for example. In the embodiment, the server setting information database 3h is provided in the server setting control unit 3c, although it may be provided outside of the unit 3c.

When the server setting control unit 3c receives the instruction for starting the test from the test start/end information processing unit 3b, for example, the server setting control unit 3c extracts necessary information from the server setting information database 3h and prepares information for changing setting of the server 5 and the load balancer 6 functioning as the load distribution unit. Further, the server setting control unit 3c receives a program for the business application operated in the server 5 to be tested, stored in the business application information database 3g from the business application provision unit 3d and transmits both information as information required to set the server 5 and the load distribution unit for suitably distributing the load of the server 5 after start of the test to the server 5 and the load balancer 6.

As a result, since setting of the load balancer 6 is changed, the server 5 is adapted to receive a request as one measure of the server constituting the business to be operated and the business application is installed in the server 5. Further, the test load control server computer 4 can receive feedback information transmitted from the server 5 in accordance with destination information of an agent.

Moreover, when the server setting control unit 3c receives the instruction for ending the test from the test start/end information processing unit 3b, the server setting control unit 3c extracts necessary information from the server setting information database 3h and transmits information for returning setting of the server 5 and the load balancer 6 functioning as the load distribution unit to the state set before implementation of the test as information required to set the server 5 and the load balancer for suitably distributing the load of the server 5 after end of the test to the server 5 and the load balancer 6.

As a result, the setting of the load balancer 6 is returned to the state set before implementation of the test and the business application is uninstalled or removed from the servers 5. Further, the destination information of the agent is also deleted therefrom.

The business application provision unit 3d provides the program for the business application operated in the server to the server setting control unit 3c.

Figure 5:
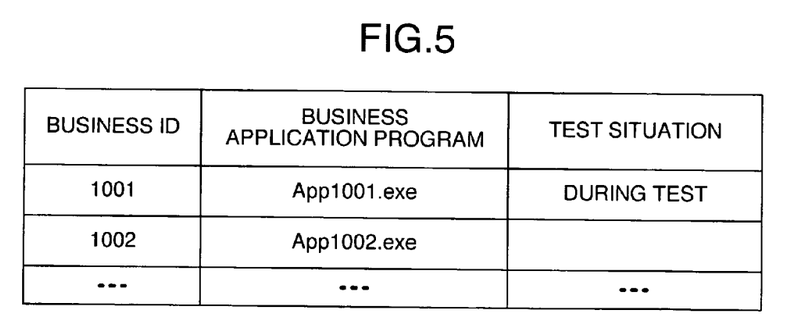
FIG. 5 shows an example of contents of information stored in a business application information database.

Information concerning the business application containing the program for the business application operated in the server 5 to be tested is stored in the business application information database 3g. For example, as shown in FIG. 5, program names for the business applications and programs for business applications are related to business IDs corresponding to the business applications to be stored therein. In the embodiment, the business application information database 3g is provided in the business application provision unit 3d, although it may be provided outside of the business application provision unit 3d.

The test result information processing unit 3e successively receives information containing test result information concerning the result of implementation of the test for measuring performance of the server 5, transmitted from the test load control server computer 4 and judges the end time of the test from the received test result information to notify information concerning the end time of the test to the test start/end information processing unit 3b.

The information containing the test result information concerning the result of implementation of the test for measuring performance of the server 5, transmitted from the test load control server computer 5 contains the test result information such as, for example, number of simultaneously responded requests per second and CPU load (%) forming the load of server, identification indices of servers to be tested, business IDs indicating business applications operated in servers and the like.

The method for judging the end time of the test from the received test result information is not limited particularly. For example, since the CPU load contained in the received test result information has a fixed range, the end time of the test can be judged from the received test result information on the basis of inclination of variation in the CPU load forming the load of server successively received.

The information concerning the end time of the test contains, for example, identification indices of servers, business IDs indicating business applications operated and the like.

The test result information management unit 3f relates the test result information obtained by the test result information processing unit 3e to the operated business application for each server to be stored and managed in the test result information database 3i.

Figure 6:
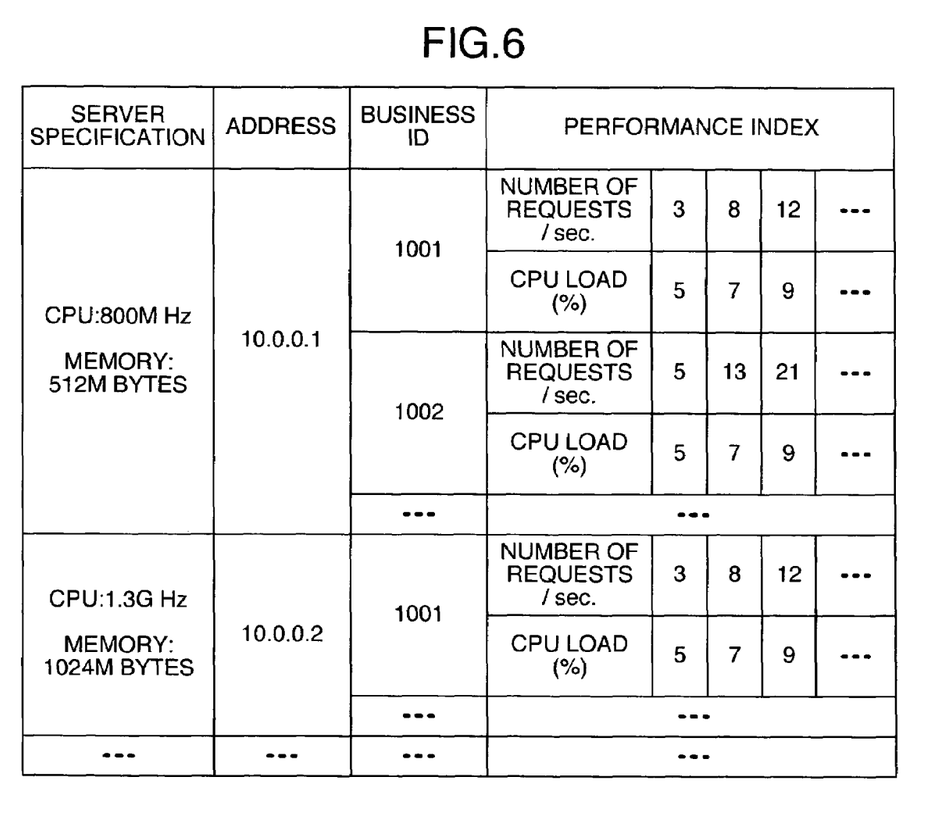
FIG. 6 shows an example of contents of information stored in a test result information database.

As shown in FIG. 6, for example, server specification, business IDs indicating operated business applications and test result information such as number of simultaneous responded requests per second and CPU load (%) are related to one another for each of identification indices of servers to be stored in the test result information database 3i. In the embodiment, the test result information database 3i is provided in the test result information management unit 3f, although it may be provided outside of the test result information management unit 3f.

Figure 7:
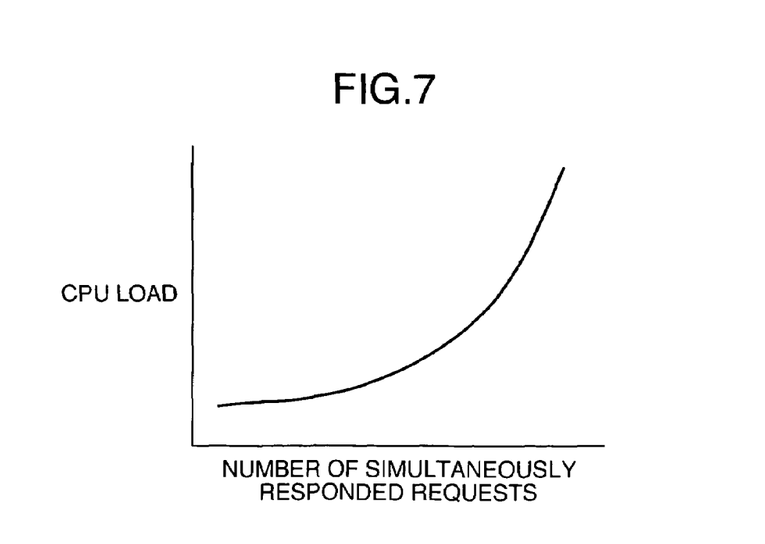
FIG. 7 is a graph showing an example of a server performance index prepared on the basis of test result information.

Since the number of simultaneous responded requests per second, CPU load (%) and the like are stored as the test result information in the test result information database 3i, a graph of the server performance index can be automatically prepared on the basis of the test result information using a usually available graph preparation tool, for example, as shown in FIG. 7. Therefore, according to the present invention, an effective index concerning the server performance and reflecting characteristics of each business application can be obtained without obstructing usual business.

The test load control server computer 4 controls the load of the server 5 to be tested and implements the test for measuring performance of the server 5. The test load control server computer 4 includes a test start processing unit 4a, a feedback information reception unit 4b, a test operation processing unit 4c and a feedback information rewriting and transmission unit 4d.

The test start processing unit 4a extracts information for controlling load of server 5 and containing a target load value of the server 5 from a database portion 4e on the basis of information necessary for start of the test, transmitted from the test start/end information processing unit 3b and starts the test for measuring performance of the server 5.

Information for controlling the load of the server 5 to be tested is stored in the database portion 4e. The database portion 4e includes a test specification information database 4f, a test configuration information database 4g and a test control information database 4h. In the embodiment, the database portion 4e is provided in the test operation processing unit 4c, although it may be provided outside of the test operation processing unit 4c.

Figure 8:
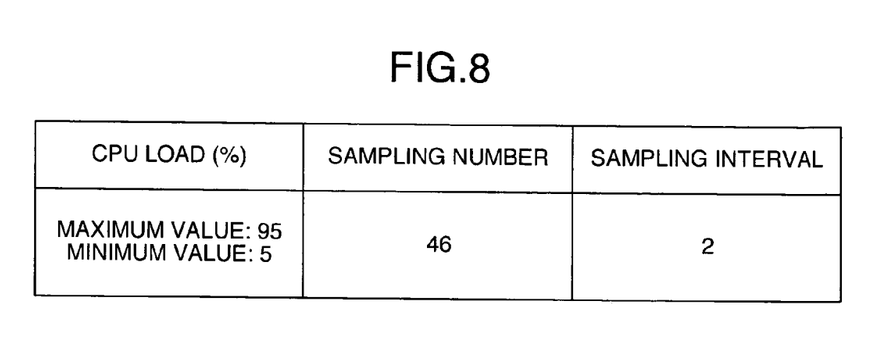
FIG. 8 shows an example of contents of information stored in a test specification information database.
Figure 9:
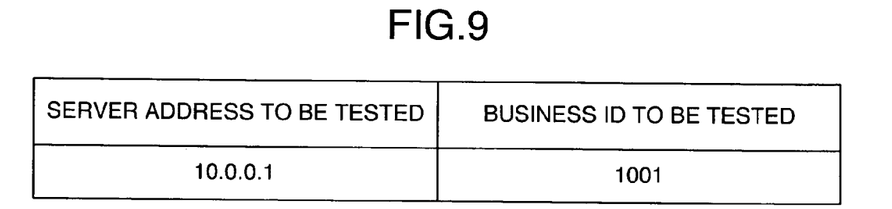
FIG. 9 shows an example of contents of information stored in a test configuration information database.
Figure 10:
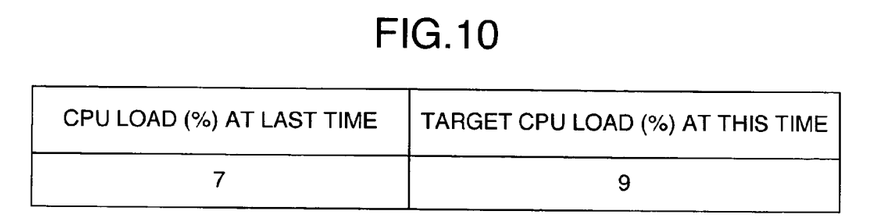
FIG. 10 shows an example of contents of information stored in a test control information database.

As shown in FIG. 8, for example, information concerning test specification such as maximum and minimum values of CPU load forming the load of server, sampling number and sampling interval is stored in the test specification information database 4f and it is not necessary to redefine the test specification in each test. As shown in FIG. 9, for example, IP address serving as identification index of the server to be tested and business ID indicating business application operated are related to each other to be stored in the test configuration information database 4g. As shown in FIG. 10, for example, CPU load at the last time and CPU load at this time are stored in the test control information database 4h. Information stored in the database portion 4e is set by a manager when the system is started, for example.

Further, when the test for measuring performance of the server 5 to be tested is started, the test is advanced by the feedback information reception unit 4b, the test operation processing unit 4c and the feedback information rewriting and transmission unit 4d.

The feedback information reception unit 4b receives feedback information transmitted from the server 5.

Figure 11:
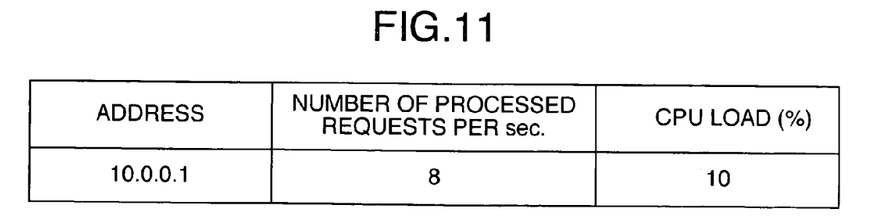
FIG. 11 shows an example of contents of feedback.

The feedback information includes, as shown in FIG. 11, for example, IP address serving as identification index of the server to be tested, number of simultaneously processed requests per second and CPU load (%) forming the load of the server.

The feedback information is originally transmitted from the server 5 to be tested to the load balancer 6 for suitably distributing the load of the server, although since a destination of agent is changed to the test load control server computer 4 in accordance with information transmitted from the server setting control unit 3c as described above, the test load control server computer 4 can receive the feedback information transmitted from the server 5 to be tested.

The test operation processing unit 4c compares a load value of the server contained in the feedback information with a target load value of the server to decide whether the load of server 5 to be tested is varied or not. When the load of server 5 is varied, the test operation processing unit 4c prepares feedback information rewriting information containing the policy for varying the load of server 5 and transmits it. When the load of the server 5 is not varied, the test operation processing unit 4c varies the target load value of the server 5 and transmits information containing test result information concerning the result of implementation of the test for measuring performance of server 5.

The test operation processing unit 4c decides whether the feedback information is rewritten or not while updating the target value of the CPU load forming the load of server 5 on the basis of information stored in the test control information database 4h so that the CPU load forming the load of server 5 is widely varied gradually in the range from light load to heavy load throughout the period that the test is implemented.

For example, when the target value of CPU load forming the load of the server is 9% and the CPU load contained in the feedback information transmitted from the server 5 is 10%, the CPU load exceeds the target value thereof and accordingly the feedback information rewriting information to the effect that the CPU load is reduced is prepared to be transmitted to the feedback information rewriting and transmission unit 4d.

At this point, when the feedback information rewriting and transmission unit 4d rewrites the feedback information transmitted from the server 5 and received by the feedback information reception unit 4b, the number of requests to the server, for example, can be controlled regardless of the load of the server 5 and consequently the load of the server 5 is varied.

When the CPU load forming the load of the server 5 is reduced and reaches 9% equal to the target value thereof, the test operation processing unit 4c accesses to the test control information database 4h to update the CPU load value at the last time and the target CPU load value at this time and transmits information containing the test result information concerning the result of implementation of the test for measuring performance of the server 5 to the test result information processing unit 3e of the test management server computer 3.

The feedback information rewriting and transmission unit 4d rewrites the received feedback information on the basis of the feedback information rewriting information and transmits the rewritten feedback information to the load balancer 6 for suitably distributing the load of the server 5.

The feedback information received by the feedback information reception unit 4b, for example, the CPU load value forming the load of the server contained in the feedback information is rewritten by the feedback information rewriting and transmission unit 4d on the basis of the feedback information rewriting information. For example, when the CPU load of the server is lightened, the CPU load value contained in the feedback information is rewritten to be increased and when the CPU load of the server is increased, the CPU load value contained in the feedback information is rewritten to be made small.

When the rewritten feedback information having the CPU load value rewritten to be increased and contained in the feedback information is transmitted to the load balancer 6 functioning as the load distribution unit for suitably distributing the load of the server 5, the load balancer 6 lightens the burden of processing to the server 5. Consequently, the CPU load forming the load of server 5 is lightened.

As described above, according to the present invention, the performance of server different depending on each business application can be measured efficiently in actual operation environment in which the business application is operated.

Figure 12:
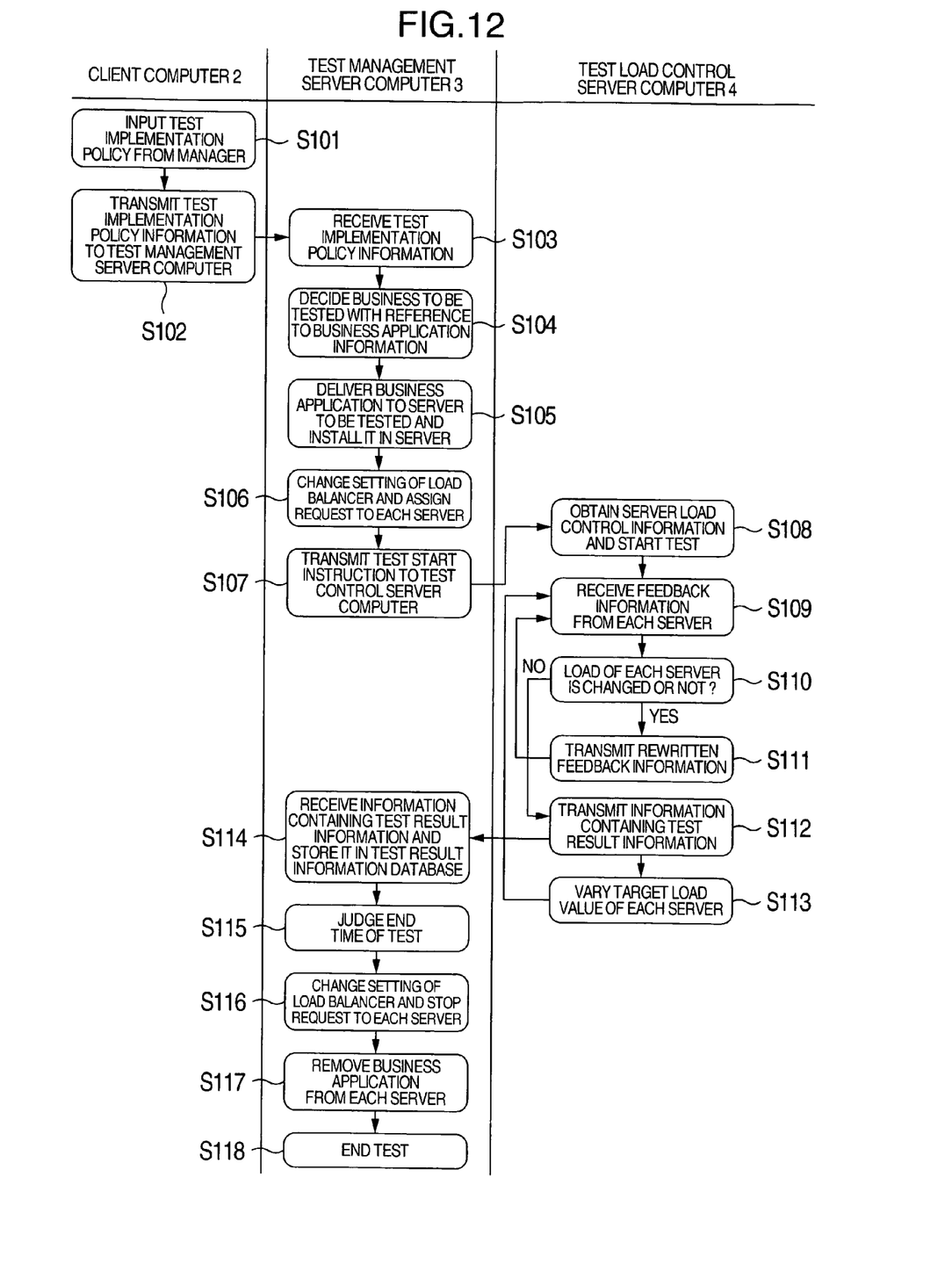
FIG. 12 is a flow chart explaining an example of processing for implementing a test in the server performance measurement system of the present invention which can implement the server performance measurement method of the present invention.

Referring now to FIG. 12, an example of processing for implementing the test in the server performance measurement system of the present invention which can implement the server performance measurement method of the present invention is described.

When the manager of the server performance measurement system inputs the policy for implementing the test for measuring performance of the server (step 101), the client computer 2 prepares the test implementation policy information and transmits the prepared test implementation policy information to the test management server computer 3 (step 102).

When the test management server computer 3 receives the test implementation policy information transmitted from the client computer 2 (step 103), the business-to-be-tested decision unit 3a extracts necessary information from the business application information database 3g and decides the server 5 to be tested and the business application operated in the server 5 (step 104).

When the server 5 and the business application operated in the server 5 are decided, information concerning the decided server 5 and business application operated in the server 5 is transmitted from the business-to-be-tested decision unit 3a to the test start/end information processing unit 3b.

The test start/end information processing unit 3b transmits to the server setting control unit 3c information concerning the server 5 and the business application operated in the server 5 together with the instruction for starting the test.

When the server setting control unit 3c receives the instruction for starting the test from the test start/end information processing unit 3b, the server setting control unit 3c receives a program for the business application operated in the server 5, stored in the business application information database 3g from the business application provision unit 3d and transmits it as information required to set the server 5 after start of the test to the server 5. Further, the server setting control unit 3c delivers the business application to the server 5 to be installed therein (step 105).

Thereafter, the server setting control unit 3c extracts necessary information from the server setting information database 3h and prepares information for changing setting of the server 5 and the load balancer 6 functioning as the load distribution unit to transmit it as information required to set the server 5 and the load balancer for suitably distributing the load of the server after start of the test to the server 5 and the load balancer 6, so that setting of the load balancer 6 is changed and a request is assigned to the server 5 (step 106).

The test start/end information processing unit 3b transmits information concerning the server 5 and the business application operated in the server 5 together with the instruction for starting the test to the test start processing unit 4a of the test load control server computer 4 (step 107).

When the test start processing unit 4a receives the information necessary for start of the test from the test start/end information processing unit 3b, the test start processing unit 4a extracts information for controlling the load of the server and containing the target load value of the server 5 from the database portion 4e on the basis of the received information necessary for start of the test and starts the test for measuring performance of the server (step 108).

The feedback information transmitted from the server is received by the feedback information reception unit 4b (step 109). The test operation processing unit 4c refers to the test control information database 4h and then compares the load value of the server contained in the feedback information with the target load value of the server to thereby decide whether the load of the server 5 varied or not (step 110).

When the load of the server 5 is varied (YES in step 110), the test operation processing unit 4c prepares the feedback information rewriting information containing the policy for varying the load of the server 5 and transmits it to the feedback information rewriting and transmission unit 4d. The feedback information rewriting and transmission unit 4d rewrites the received feedback information on the basis of the feedback information rewriting information and transmits the rewritten feedback information to the load balancer 6 for suitably distributing the load of the server (step 111).

When the load of the server 5 is not varied (NO in step 110), the test operation processing unit 4c transmits information containing the test result information concerning the result of implementation of the test for measuring performance of the server 5 to the test result information processing unit 3e of the test management server computer 3 (step 112) and varies the target load value of the server 5 (step 113).

The test result information processing unit 3e successively obtains or receives the information containing the test result information concerning the result of implementation of the test for measuring performance of the server 5 from the test load control server computer 4 and the test result information management unit 3f relates the information to the operated business application for each server 5 to be stored and managed in the test result information database 3i (step 114).

When the test result information processing unit 3e judges the end time of the test from the received test result information (step 115), the test result information processing unit 3e notifies information concerning the end time of the test to the test start/end information processing unit 3b. The test start/end information processing unit 3b which has received the information concerning the end time of the test transmits an instruction for ending the test to the server setting control unit 3c.

The server setting control unit 3c which has received the instruction for ending the test from the test start/end information processing unit 3b extracts necessary information from the server setting information database 3h and transmits information for returning the setting of the server 5 and the load balancer 6 to the state set before implementation of the test as information required to set the server 5 and the load balancer for suitably distributing the load of the server after end of the test to the server 5 and the load balancer 6, so that the setting of the load balancer 6 is returned to the state set before implementation of the test and the destination information of the agent is deleted to thereby stop the request to the server 5 (step 116). Thereafter, the business application is uninstalled or removed from the server 5 (step 117) and the test is ended (step 118).

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

The invention claimed is:

1. A server performance measurement method for measuring performance of a server among a plurality of servers which execute a business application and serve requests from users for services provided by the business application, comprising the steps of:
   a first step of determining first information necessary for a test to measure performance of a server computer to be tested;
   a second step of obtaining second information from a database on the basis of the first information, preparing third information used to cause a load balancer to perform the test on the server, and transmitting the second and third information to the server and the load balancer, wherein the load balancer also operates to receive requests from users and to forward the requests received from the users to one of the servers;
   a third step of producing fourth information that controls the load of the server and that contains a target load value of the server from a database on the basis of the first information and starting the test to measure performance of the server;
   a fourth step of receiving feedback information from the server, the feedback information including a measured load value of the server indicative of loading on the server;
   a fifth step of comparing the measured load value with the target load value to decide whether the load on the server is to be varied or not, wherein when the load on the server is to be varied, then preparing feedback information rewriting information that contains a policy for varying the load of the server, and when the load on the server is not to be varied, then varying the target load value for a subsequent test of the server wherein result information concerning a result of the test to measure performance of the server is stored in the database;
   a sixth step of rewriting the feedback information on the basis of the feedback information rewriting information and transmitting the rewritten feedback information to the load balancer;
   a seventh step of successively obtaining the information concerning the measurement result in the fifth step and judging end time of the measurement from the obtained information; and
   an eighth step of associating the result information with the business application operated in the server, and storing to the database information representative of the association.

2. A server performance measurement method according to claim 1, further comprising the step of:
   providing a program for the business application operated in the server to the server.

3. A server performance measurement method according to claim 1, further comprising the step of:
   deciding the server and the business application on the basis of information defining policy for measuring performance of the server.

4. A server performance measurement method according to claim 2, further comprising the step of:
   deciding the server and the business application on the basis of information defining policy for measuring performance of the server.

5. A server performance measurement system for measuring performance of a server computer among a plurality of server computers which execute a business application, including
   a load balancer for suitably distributing loads of the plurality of server computers, the load balancer receiving requests from users for service provided by the business application, the load balancer distributing the requests from the users among the plurality of server computers,
   a management server computer for providing information necessary for a test to measure performance of the server and for recording a result of the measurement to be managed, and
   a load control server computer for controlling the load of the server to perform the test to measure performance of the server, which are connected to one another in a mutually communicatable state,
   wherein the management server computer comprises:
      start/end information processing means for transmitting to the load control server first information necessary for of the test to measure performance of the server;
      setting control means for obtaining, based on the first information, second information from a database which stores information concerning the plurality of server computers and the load balancer and for preparing third information to cause the load balancer to perform the test to measure performance of the server, the second and third information being transmitted to the server and to the load balancer;
      result information processing means for successively obtaining result information concerning a result of the test to measure performance of the server, received from the load control server computer and judging end time of the measurement on the basis of the obtained result information; and
      result information management means for associating the information with the business application operated in the server, storing in the database information representative of the association,
   wherein the load control server computer comprising:
      start processing means for producing fourth information that controls the load of the server and that contains a target load value of the server from a database on the basis of the first information and starting the test to measure performance of the server,
      feedback receiving means for receiving feedback information from the server, the feedback information including a measured load value of the server indicative of loading on the server,
      operation processing means for comparing the measured load value with the target load value to decide whether or not the load of the server is to be varied, wherein when the load of on the server is to be varied, then preparing feedback information rewriting information that contains policy for varying the load of the server, and when the load of on the server is not to be varied, then varying the target load value for a subsequent load measurement and storing result information concerning result of the measurement of performance of the server, and
      feedback rewriting means for rewriting the feedback information on the basis of the feedback information rewriting information and transmitting the rewritten feedback information to the load balancer.

6. A server performance measurement system according to claim 5, wherein
   the management server computer further comprises business application provision means for providing a program for the business application operated in the server to the setting control means, and the setting control means of the management server computer extracts information from the database in which the information concerning the plurality of server computers and the load balancer is stored and the database in which information concerning the business application operated in the server is stored on the basis of an instruction from the start/end information processing means, preparing information for setting the server and the load balancer, and transmitting the information prepared to the server and the load balancer.

7. A server performance measurement system according to claim 5, further comprising:

a client computer connected to the management server computer in a mutually communicatable state to prepare information defining policy for measuring performance of the server to be transmitted to the management server computer.

8. A server performance measurement system according to claim 6, further comprising:

a client computer connected to the management server computer in a mutually communicatable state and preparing information defining policy for measuring performance of the server to be transmitted to the management server computer.

9. A server performance measurement system according to claim 7, wherein the management server computer further comprises business-to-be-tested decision means for deciding the server and the business application operated in the server on the basis of the information defining the policy transmitted from the client computer.

* * * * *